Feb. 21, 1967　　　J. G. SAFAR　　　3,305,721
ELECTRICAL CONTROL SYSTEM
Filed March 2, 1964　　　2 Sheets-Sheet 1

INVENTOR
JOHN G. SAFAR

BY Arnold J. Ericsen
ATTORNEY

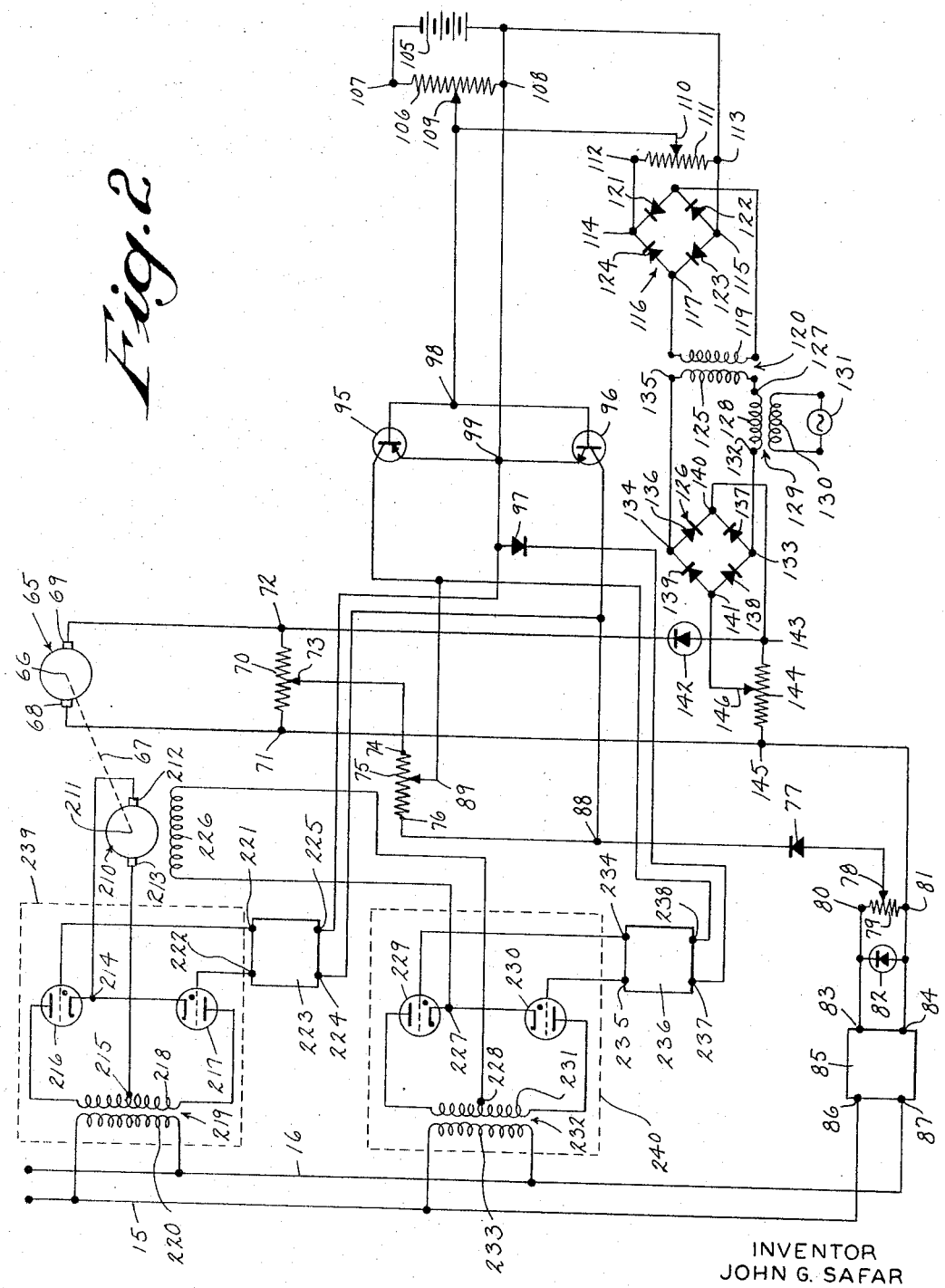

United States Patent Office 3,305,721
Patented Feb. 21, 1967

3,305,721
ELECTRICAL CONTROL SYSTEM
John G. Safar, Milwaukee, Wis., assignor to Allen-Bradley Company, Milwaukee, Wis., a corporation of Wisconsin
Filed Mar. 2, 1964, Ser. No. 348,457
5 Claims. (Cl. 318—328)

The present invention relates to a controllable electrical power supply, and more particularly, to an automatic, continuous control system wherein an electrical signal through a single or a plurality of circuits may be controlled alternatively or simultaneously.

Systems automatically and continuously controlling the time and magnitude of current flowing through various circuits have numerous uses both in the laboratory and industry. Expansion of industrial activities, mechanization of manufacture, and automation of industrial processes, have greatly increased the use of electric machines and have placed greater demands on their control systems. Accordingly, as means of illustration, the present invention will be disclosed in reference to its application as a device for continuously and automatically controlling the speed of an electric motor over a very broad speed range by controlling both its field and armature excitation, but those skilled in the art will perceive other applications for such a controllable power supply. The same system also controls the torque and horsepower of the machine.

It is well known in the speed control art that at low speeds control may be accomplished by controlling either the armature excitation or field excitation; but on the other hand, high speeds may be controlled most effectively through field excitation. Also, the choice of armature or field control may depend on whether one desires constant torque, in which case the armature excitation is varied and the field excitation held constant; or constant horsepower, in which case the field excitation is varied and the armature excitation held constant. At speeds wherein the armature current is relatively constant, control may be accomplished by varying the field excitation, thus resulting in constant horsepower and variable torque operation. There are many applications, however, where it is desirable that at low speeds operation of the motor horsepower be held constant and the torque controlled by varying the field excitation.

The need for such a versatile, broad-range control is satisfied by the automatically controlled cross-over network of the present invention. This invention provides a new circuit which will allow armature control throughout a portion of the motor speed range, field control throughout another portion of the motor speed range, and an automatic cross-over from one type of control to another at a predetermined speed. The present circuit also permits the motor to cross over from a constant torque machine to a constant horsepower machine. Of course, cross-over may occur in either direction depending upon the needs of the application of this invention.

The present invention is illustrated in connection with a closed-cycle motor control system including a cross-over network wherein automatic, continuous and precise speed control is obtained from a generated feedback voltage proportional to the actual motor speed. The voltage is applied to a voltage detector and compared to a speed calibrated reference voltage set according to the desired speed. The difference between the two voltages is the error signal, which in turn is applied to controller circuits which provide a means for controlling the excitation applied to the armature and field windings. The error signal determines the conduction of the controllers, automatically controlling the excitation of the armature or field or both. The variation is excitations controls the actual speed of the machine so that it will coincide with the desired speed. The invention permits the use of static circuit components such as transistors, diodes and resistors; thereby providing a compact, rugged and economical device. The use of static components further increases the utility of the network in undesirable atmospheres, since these components can be easily and economically sealed off from moisture and other foreign particles of the atmosphere.

Accordingly, it is an object of the present invention to provide a control system which automatically controls the power supplied to a single or plurality of electrical circuits.

It is another object of the present invention to provide an electrical control system which automatically controls the current or voltage of a single or plurality of electrical circuits.

It is another object of the present invention to provide a direct current voltage system which simultaneously controls the magnitude and timing of electrical signals passing through a single or plurality of electrical circuits.

It is another object of the present invention to provide a cross-over network for an electrical machine which automatically, simultaneously and alternatively controls the field and armature excitation of said machine.

It is a further object of the present invention to provide a direct current control capable of being utilized as a cross-over network for an electrical machine and which is compact, reliable and efficient.

The foregoing and other objects will appear in the description to follow. In the description, reference is made to the accompanying drawings which form a part hereof in which there is shown by way of illustration specific embodiments in which this invention may be practiced. These embodiments will be described in sufficient detail to enable those skilled in the art to practice this invention, but it is to be understood that other embodiments of the invention may be used and that changes may be made in the embodiments described without departing from the scope of the invention. Consequently, the following detailed description is not to be taken in a limiting sense, instead, the scope of the present invention is best defined by the appended claims.

In the drawings:

FIG. 2 is a schematic diagram of an embodiment of the present invention used to control the conduction time of thyratron tubes which are incorporated in connection with an electronic control for a direct current motor.

Figure 1:
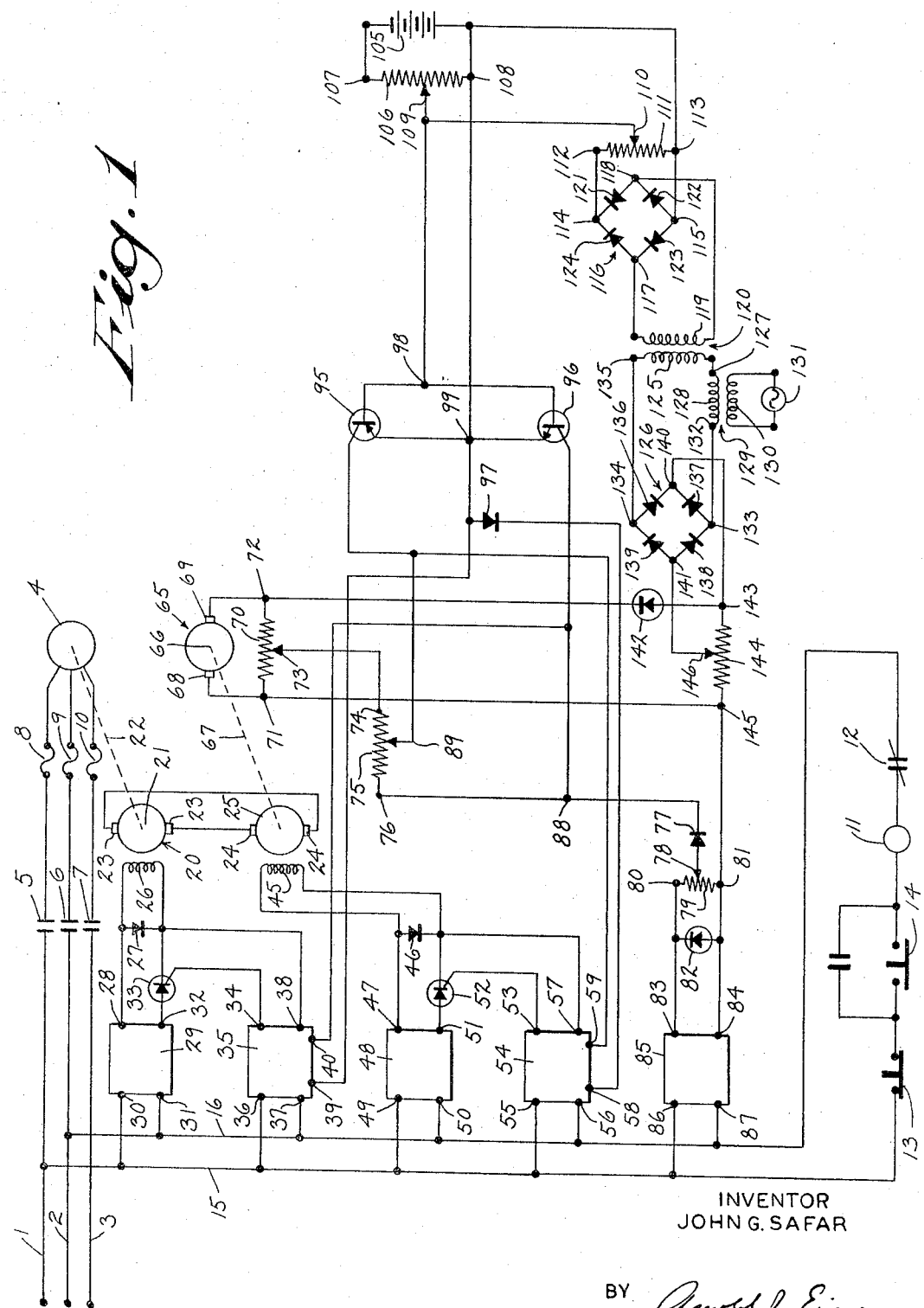
FIG. 1 is a schematic diagram of an embodiment of the present invention used to control the conduction time of silicon controlled rectifiers which are incorporated in connection with a control for a motor-generator drive system.

FIG. 1 diagrammatically illustrates a motor-generator drive system incorporating an embodiment of the present invention and designed to control the speed of a shunt wound direct current motor. The system comprises six general elements: a controllable power supply; a controllable armature and field excitation system; a feedback source; an error detector; a current gate control circuit; and a cross-over trigger signal circuit.

Referring specifically to FIG. 1, the controllable power supply includes a set of three-phase power lines 1, 2 and 3. The supply further includes a prime mover represented by a synchronous alternating current motor 4 which is connected across the power lines 1, 2 and 3 through a motor starter comprising a set of main contacts 5, 6 and 7; a corresponding set of overload relays 8, 9 and 10; a coil 11; an overload relay contact 12; and a pushbutton station, including a pair of switches 13 and 14. The coil 11, the overload relay contact 12 and the pushbutton switches 13 and 14 are connected to a pair of single phase power lines 15 and 16 which are connected across the lines 1 and 2 of the three-phase voltage source; thus completing the controllable power supply.

The controllable armature and field excitation system includes a direct current generator 20 having a rotor 21 mechanically connected to the alternating current motor 4 through a mechanical coupling 22. An armature winding 23 of the direct current generator 20 is connected to an armature winding 24 of a shunt wound direct current motor 25. The direct current motor 25 of the motor-generator drive system illustrated in FIG. 1 represents the device to be controlled. A field winding 26 of the direct current generator 20 is connected in parallel with a diode 27. The anode of the diode 27 is connected to an output terminal 28 of a conventional full-wave rectifier 29 diagrammatically represented in block form. A pair of input terminals 30 and 31 to the rectifier 29 are connected to the power supply lines 15 and 16, respectively. A second output terminal 32 of the full-wave rectifier 29 is connected to a silicon controlled rectifier 33. The cathode of the silicon controlled rectifier 33 is connected to the cathode of the diode 27 and to the field winding 26. The gate lead of the rectifier 33 is tied to an output terminal 34 of a conventional gate firing circuit 35 diagrammatically represented in block form. A pair of input terminals 36 and 37 of the firing circuit 35 are connected to the power supply lines 15 and 16, respectively. A second output terminal 38 of the firing circuit 35 is tied to the cathode of the silicon controlled rectifier 33. The gate firing circuit 35 has a third pair of terminals 39 and 40 to receive a control signal.

The controllable armature and field excitation system also includes a field winding 45 of the direct current motor 25 which is connected across a diode 46. The anode of the diode 46 is connected to an output terminal 47 of a conventional full-wave rectifier 48 diagrammatically represented in block form. The full-wave rectifier 48 has a pair of input terminals 49 and 50 connected across the power supply lines 15 and 16, respectively. A second output terminal 51 of the full-wave rectifier 48 is connected to a silicon controlled rectifier 52. The cathode of the silicon controlled rectifier 52 is connected to the cathode of the diode 46 and the field winding 45. The gate lead of the silicon controlled rectifier 52 is tied to an output terminal 53 of a conventional gate firing circuit 54 diagrammatically represented in block form. The gate firing circuit 54 has a pair of power input terminals 55 and 56 connected across the power supply lines 15 and 16, respectively. A second output terminal 57 of the firing circuit 54 is tied to the cathode of the silicon controlled rectifier 52. The gate firing circuit 54 has a third pair of input terminals 58 and 59 to receive a control signal; thus completing the controllable armature and field excitation system.

The feedback circuit, as shown in FIG. 1, includes a tachometer generator 65. A rotor 66 of the tachometer generator 65 is connected to the direct current motor 25 through a mechanical coupling 67. A pair of output terminals 68 and 69 are connected to the armature of the tachometer generator; thus completing the feedback circuit.

The error detector circuit includes a potentiometer 70 having a pair of fixed terminals 71 and 72 connected to the armature winding terminals 68 and 69 of the tachometer generator 65, respectively. A movable contact 73 of the potentiometer 70 is connected to a fixed terminal 74 of a potentiometer 75. A second fixed terminal 76 of the potentiometer 75 is tied to the cathode of a diode 77. The anode of the diode 77 is connected to a movable contact 78 of a potentiometer 79. Across a pair of fixed terminals 80 and 81 of the potentiometer 79 is connected a Zener diode 82 with the cathode connected to the fixed terminal 80 and the anode connected to the fixed terminal 81. The Zener diode 82 is also connected across a pair of output terminals 83 and 84 of a rectifier 85 diagrammatically represented in block form. A pair of power input terminals 86 and 87 of the rectifier 85 is connected to the power supply lines 15 and 16, respectively. The output signal of the error detector circuit appears across a movable contact 89 of the potentiometer 75 and a terminal 88 which is common to the fixed terminal 76 of the potentiometer 75 and the cathode of the diode 77; thus completing the error detector circuit.

The current gate control circuit of the embodiment set forth in FIG. 1 includes a current gate which is illustrated by a PNP transistor 95 connected in parallel with a second current gate which is illustrated by a NPN transistor 96 with the base of the transistor 95 connected to the base of the transistor 96 and the emitter of the transistor 95 connected to the emitter of the transistor 96. The collector of the transistor 95 is connected to the movable contact 89 of the potentiometer 75 and also to the control input terminal 59 of the gate firing circuit 54. The collector of the transistor 96 is connected to the terminal 88 and to the control input terminal 40 of the gate firing circuit 35. The commonly connected emitters of the transistors 95 and 96 are connected to the control input terminal 39 of the gate firing circuit 35 and also to the anode of a diode 97. The anode of the diode 97 is connected to the commonly connected emitters of the transistors 95 and 96, and the cathode is connected to the control input terminal 58 of the gate firing circuit 54. A trigger input signal to the current gate control circuit is received at a pair of terminals 98 and 99, the former of which is common to the bases of the transistors 95 and 96 and the latter of which is common to the emitters of the transistors 95 and 96; thus completing the current gate control circuit.

The cross-over trigger signal circuit is comprised of a fixed direct current voltage supply 105 connected across a potentiometer 106. The negative potential terminal of the direct current supply source 105 is connected to a fixed terminal 107 of the potentiometer 106, and the positive potentiometer terminal is connected to a second fixed terminal 108 of the potentiometer 106. The fixed terminal 108 is connected to the input terminal 99. A movable contact 109 of the potentiometer 106 is connected to the input terminal 98 and also to a movable contact 110 of a potentiometer 111. A pair of fixed terminals 112 and 113 of the potentiometer 111 is connected across a pair of output terminals 114 and 115 of a four terminal full-wave bridge rectifier designated generally by the reference character 116. The four terminal full-wave bridge rectifier 116 has a second pair of input terminals 117 and 118 which are connected across a winding 119 of a transformer 120.

The bridge rectifier 116 of the cross-over trigger signal circuit is comprised of a set of four diodes 121, 122, 123 and 124. The output terminal 114 is connected to the cathodes of the diodes 121 and 124. The second output terminal 115 is connected to the anodes of the diodes 122 and 123. The input terminal 117 is connected to the anode of the diode 124 and to the cathode of the diode 123. The input terminal 118 is connected to the anode of the diode 121 and the cathode of the diode 122. Another winding 125 of the transformer 120 is connected to a second four terminal full-wave bridge rectifier designated generally by the reference character 126, and also to a terminal 127 of a winding 128 of a transformer 129. A second winding 130 of the transformer 129 is connected across an alternating current voltage source 131. A second fixed terminal 132 of the transformer 129 is connected to an output terminal 133 of the bridge rectifier 126. A second output terminal 134 of the bridge rectifier 126 is connected to a fixed terminal 135 of the transformer winding 125.

The bridge rectifier 126 of the cross-over trigger circuit signal circuit is comprised of a set of diodes 136, 137, 138 and 139. The anode of the diode 136 and the cathode of the diode 139 are connected to the output terminal 134. The anode of the diode 137 and the cathode of the diode 138 are connected to the output terminal 133. The cathode of the diode 136 and the cathode of the diode 137 are connected to an input terminal 140 of the bridge rectifier 126. The anode of diode 138 and the anode of diode 139 are connected to a second input terminal 141 of the bridge rectifier 126. The input terminal 140 is also connected to the anode of a Zener diode 142 and also to a fixed terminal 143 of a potentiometer 144. The cathode of the Zener diode 142 is connected to the fixed terminal 72 of the potentiometer 70. A second fixed terminal 145 of the potentiometer 144 is connected to the fixed terminal 71 of the potentiometer 70 and also to the fixed terminal 81 of the potentiometer 79. A movable contact 146 of the potentiometer 144 is connected to the input terminal 141 of the bridge rectifier 126; thus completing the circuitry of the cross-over trigger signal circuit.

The theoretical operation of the above-described system is believed to be as hereafter set forth. The power of the controllable power supply appears across the lines 1, 2 and 3, and is introduced to the system through the pushbutton station comprising the switches 13 and 14 which are manually closed so as to apply voltage and close the starter contacts 5, 6 and 7. Upon closure of the contacts 5, 6 and 7, electrical power from the power supply lines 1, 2 and 3 is delivered to the prime mover represented in this illustration by the synchronous alternating current motor 4, thus causing the motor 4 to rotate. The power supply lines 15 and 16 connected across the power supply lines 1 and 2 provide a single phase power source for other elements of the system.

The mechanical coupling 22 which joins the synchronous alternating current motor 4 of the controllable power supply to the rotor 21 of the direct current generator 20 causes the rotor 21 to rotate at a constant speed equal to that of the synchronous alternating current motor 4. Those skilled in the art will readily recognize that there are numerous devices available which may be utilized as a prime mover for driving the direct current generator at a constant speed.

Furthermore, it is common knowledge that the output voltage of a direct current generator is dependent upon the magnitude of the excitation of the field winding and also the rotational speed of the armature. Thus, the magnitude of the voltage generated by the generator 20 and applied to the armature winding 24 of the direct current motor 25 is dependent upon the field excitation and rotational speed of the generator 20. Due to the fact that the direct current generator 20 is driven by the synchronous motor 4 at a constant speed, controlled variations in the magnitude of the armature voltage are dependent upon controlled variations in the field excitation of the generator 20. It is also common knowledge to those skilled in the art that the speed of the direct current motor 25 is dependent upon the excitation applied to the armature windings 24. Since the armature windings 24 of the motor 25 are connected to the armature windings 23 of the generator 20, controlling variations in the field excitation of the generator result in controlled speed variations of the motor 25.

The speed of the motor 25 is also dependent upon the excitation of the field winding 45. Thus, in the case of constant armature excitation, variations in field excitation will provide a similar variation in speed. The speed range over which the armature winding 24 has control is considerably less than the range over which the field winding 45 has control. For example, in many situations the speed range of a motor is increased three or four times by variations in field excitation over that where the field excitation is fixed. Furthermore, if the field excitation is held constant and the armature excitation varied, the motor acts as a constant torque machine; and, if the armature excitation is held constant and the field excitation varied, the motor acts as a constant horsepower machine. There are several applications requiring a machine to operate as a constant torque during low speeds, and then at a certain predetermined speed cross over and operate at a constant horsepower. The system illustrated by FIG. 1 of this invention discloses an electronic circuit which is utilized as a cross-over network whereby the speed at which a machine switches operation from either constant horsepower to constant torque, or from constant torque to constant horsepower may be adjusted to the desired speed and thereafter automatically controlled.

Control of the excitation of the field winding 26 of the generator 20 is accomplished by controlling the current flowing through the winding. Control of the current is accomplished by the use of the full-wave rectifier 29 which serves as a power source to said winding and converts the alternating current voltage appearing across the power lines 15 and 16 to a full-wave rectified voltage. Those skilled in the art will readily recognize that there are numerous full-wave rectifier circuits which will satisfy the needs of the rectifier 29. The full-wave rectified voltage is applied to the silicon controlled rectifier 33 such that the applied potential of the anode with respect to the cathode is always positive. In the absence of a signal on the gate of the rectifier 33 which is positive with respect to the cathode, the rectifier blocks current flow and the field excitation from the rectifier 29 is zero. However, when the gate receives a positive signal, the rectifier commences conduction and permits current to flow through the field winding 26 for the remainder of the half cycle. The silicon controlled rectifier 33 regains control when the anode voltage drops to zero and does not conduct again until the gate receives another positive signal. The magnitude of the current flowing through the winding 26 is controlled by controlling the time during the half cycle of anode voltage that the gate receives a positive pulse. This in turn determines the length of time that the rectifier 33 will conduct. The free-wheeling or back diode 27 conducts inductive currents during the period when the rectifier 33 blocks current flow. In the absence of said diode, inductive currents continue to flow through the full-wave rectifier 29 and the silicon controlled rectifier 33 at the time that the applied potential reaches zero. Thus, since the net voltage across the rectifier 33 could never reach zero, the rectifier 33 would not be able to regain control in the absence of the diode 27.

The current passing through the field winding 45 of the motor 25 is controlled in a manner similar to that in which the current flowing through the field winding 26 of the generator 20 is controlled. The full-wave rectifier 48, the silicon controlled rectifier 52, and the diode 46 are similar and operate in a manner similar to that of the full-wave rectifier 29, the silicon controlled rectifier 33, and the diode 27, as described above.

The gate firing circuits 35 and 54 each supply a positive gate signal to the silicon controlled rectifiers 33 and 52, respectively; which, as previously described above, controls conduction of the rectifiers. In the illustration, the firing circuits are diagrammatically represented in block form as there are numerous devices available which will supply a controllable signal output and satisfy the needs of the gate firing circuits 35 and 54. As means of illustration of the numerous devices available; magnetic amplifiers, reed switches or other mechanical devices, resistance-inductance or resistance-capacitance circuits with a phase shift reactor, and transistor circuits comprising a unijunction relaxation oscillator or a unijunction resistance-capacitance can be utilized. The firing circuits 35 and 54 are energized by the power supply lines 15 and 16. The magnitude and timing of the output pulse of the gate firing circuits 35 and 54 is dependent upon the input signal fed into the control terminals 39, 40 and 58, 59 of the gate firing circuits 35 and 54, respectively. Accordingly, by controlling the input signal the conduction times of the silicon controlled rectifiers 33 and 52 are controlled and in turn control the magnitude of the excitation current flowing through the field windings 26 and 45.

Control of the input signal fed into the gate firing circuits is believed to be accomplished in the following manner: When the direct current motor 25 rotates, the mechanical coupling 67 between the motor and the tachometer generator permits the tachometer generator to rotate. Rotation of the rotor 66 of the tachometer 65 results in the generation of a direct current voltage which in turn appears across the armature terminals 68 and 69 of the tachometer 65. This voltage is referred to as the feedback signal and is directly proportional to the actual speed of the motor. Accordingly, a comparison of the feedback signal with a signal representing the desired speed provides a signal which is proportional to the difference between the actual speed and desired speed of the motor 25. This signal is referred to as the error signal.

In the system illustrated in FIG. 1, the above-described error signal appears between the terminals 88 and 89. This is accomplished by the use of the potentiometer 70, which is in parallel with the feedback signal. A portion of the feedback is tapped off and appears across the fixed terminal 71 and the movable contact 73. A reference signal representative of the desired speed of the direct current motor 25 appears across the potentiometer 79. The reference signal may be adjusted by varying the movable contact 78 so that the desired speed can be set according to the demands of each specific application. The potential across the movable contact 78 is positive with respect to the potential at the fixed contact 81. The feedback voltage applied across the potentiometer 70 is such that the terminal 71 is negative with respect to the potential at the terminal 72. The negative potential terminal 71 and the negative potential terminal 81 are common so that there is a positive potential appearing across the movable contact 73. The reference potential and feedback potential are opposing such that the difference in magnitude between the two appears across the fixed terminals 74 and 76 of the potentiometer 75. The difference provides an error signal which appears across the terminal 88 and the movable contact 89 of the potentiometer 75.

The error signal is applied to the current gate control circuit between the collectors of the transistors 95 and 96 and serves as a bias. The magnitude of the error signal determines the speeds of the direct current motor 25 at which the transistors 95 and 96 will commence to conduct. Also, the movable contact 89 of potentiometer 75 provides a means for adjusting the portion of error signal that is applied across the transistors 95 and 96. This in turn provides a means of varying the sensitivity of the speed regulation according to the requirements of the specific application. For example, for certain applications the speed regulation need not be critical and may vary several percent. Thus, a signal applied to the collectors would be only a small portion of the total error signal. On the other hand, if the speed regulation is critical, the entire error signal can be applied across the collectors. Though the error signal appearing across the collectors of the transistors 95 and 96 determines the magnitude of the current passing through said transistors, the time at which conduction commences is dependent upon the signal received by the bases.

The cross-over trigger signal circuit provides a signal between the bases and emitters of the transistors 95 and 96 which determines the speeds when each transistor is to conduct. The direct current voltage supply source 105 and the potentiometer 106 provide an adjustable signal to the bases of the transistors which is negative with respect to the potential of the emitters. In parallel with the direct current source is a variable direct current voltage source connected to the movable contact 109 and the terminal 108. The variable source is connected such that its polarity opposes the polarity of the fixed direct current voltage source. Thus, if the magnitude of the fixed source exceeds that of the variable source the net difference is negative, base with respect to emitter. If the variable exceeds the fixed, the net difference is positive. Since the transistor 95 is a PNP and the transistor 96 a NPN, the polarity of the net voltage determines which of the firing circuits 35 or 54 receives an input signal at its control terminals. This in turn determines whether the field or armature excitation will be varied and the magnitude of the variation.

The variable direct current source appearing across the fixed direct current source is proportional to the speed of the motor 25 and is created by the use of the potentiometer 144. The feedback signal appears across the fixed terminals 143 and 145 and a portion of the feedback signal is tapped off and appears across the movable contact 146 and the fixed contact 143. This voltage is applied to the input terminals 140 and 141 of the bridge rectifier 126 where it is superimposed upon the full-wave rectified signal appearing at the terminals 140 and 141 of the bridge rectifier 126.

A full-wave rectified signal which is superimposed upon the feedback signal is created by the combination of the external alternating current source 131, the transformer 129, and the bridge rectifier 126. The alternating current voltage appears across the secondary winding 128 of the transformer 129. The voltage is applied directly to the input terminal 133 of the diode bridge 126 and also to the input terminal 134 of the diode bridge 126 through the primary winding 125 of the transformer 120. The net signal of the direct current voltage across the movable contact 146 and the fixed contact 143 of the potentiometer 144 and the alternating current voltage across the transformer winding 128 is fed through the transformer 120 and appears across the secondary winding 119. The potential across the secondary winding 119 is applied to the terminals 117 and 118 of the bridge rectifier 116 which rectifies the composite signal. Thus, a direct current voltage proportional to the actual speed of the motor 25 appears across the potentiometer 111.

The polarity of the feedback potential appearing across potentiometer 111 is such that the movable contact 110 is positive with respect to the fixed contact 113. Therefore, the variable direct current voltage is of opposite polarity to that of the fixed direct current voltage source. Accordingly, as the speed of the motor 25 varies, the variable direct current voltage also varies. Instances in which the magnitude of the variable source exceeds the fixed source, the net potential between the base terminal 98 and the emitter terminal 99 is positive such that the transistor 96 conducts. When the net difference is negative, in which case the fixed direct current voltage source exceeds the variable direct current source, the transistor 95 conducts. Adjustments in the potentiometers 144, 111, and 109 can be made so as to select the speed range in which each transistor is to conduct and the specific speed at which conduction is to cross-over from one transistor to the other.

The connection of the control input terminals 39, 40 and 58, 59 of the gate firing circuits 35 and 54, respectively, provide means whereby the armature and field excitation of the motor 25 is controlled. During the time that the transistor 95 is conducting, the gate firing circuit 35 receives a signal and the armature excitation of the direct current motor 25 is controlled by controlling the field excitation of the direct current generator 20. Likewise, during the time that the transistor 96 is conducting the gate firing circuit 54 receives a signal at its control input terminals, and the excitation to the field winding 45 is controlled. The diode 97 prevents a reverse current from flowing through the gate firing circuit 54 during the period that the transistor 95 is conducting.

The incorporation of the Zener diode 142 in the cross-over trigger signal circuit determines the speed at which voltage is to be applied to the variable direct current voltage source. If the speed of the motor 25 is not sufficient to generate a voltage across the armature terminals 68 and 69 of the tachometer 65 that exceeds the breakdown potential of the Zener diode 142, the input potential to the variable direct current voltage source is zero, and the bases of the transistors 95 and 96 are triggered by the fixed direct current voltage source. Since the fixed direct current voltage source always provides a negative potential to the base, the net potential will be negative such that only the transistor 95 conducts, and in turn only the armature excitation of the motor 25 will be controlled. This condition continues to exist until the Zener diode 142 breaks down and the output potential of the variable direct current source exceeds that of the fixed direct current source. Also, the Zener diode 82 insures that the reference potential appearing across potentiometer 79 will be limited to a maximum which is equal to the breakdown voltage of the Zener diode 82.

In the cross-over trigger signal circuit above described, the variable direct current voltage opposing the fixed direct current voltage source is shown as being established by a circuit in which the input signal appearing across the potentiometer 144 is isolated from the output potential appearing across potentiometer 111. The isolating circuit includes the above-described diode bridges 116, 126 and the alternating current voltage source established through the combination of the external signal 131 and transformer 129. The isolating circuit isolates the feedback signal from the remainder of the circuit thereby insuring proper control signals free of extraneous signals. While control systems incorporating the principles of this invention will operate without the incorporation of the above-described isolating circuit, machine stability is considerably improved by incorporating the isolating circuit.

The utility of the principles of this invention in speed control is not limited to control systems utilizing silicon controlled rectifiers. The embodiment set forth in FIG. 2 further illustrates the versatility of the principles of this invention wherein an electronic circuit having thyratron tubes is utilized in the controllable armature and field excitation element of the system. The six general elements of a controllable power supply, a controllable armature and field excitation system, a feedback source, an error detector, a current gate control circuit and a cross-over trigger signal circuit of the system are similar to those of FIG. 1, except for the controllable armature and field excitation element. As a means of convenience, the controllable power supply of FIG. 2 shows only the pair of single phase power lines 15 and 16. Also, all components of the feedback source, the error detector, the current gate control circuit and the cross-over trigger signal circuit carry the same reference numerals as used in FIG. 1.

The controllable armature and field excitation circuit includes a shunt wound direct current motor 210 having a rotor 211 which is mechanically coupled to the tachometer generator 66 through the mechanical coupling 67. A pair of armature terminals 212 and 213 are respectively tied to a pair of output terminals 214 and 215. The first output terminal 214 is connected to the cathode of a pair of thyratron tubes 216 and 217 which are connected in parallel. The second output terminal 215 is tied to a winding 218 of a transformer 219. The winding 218 is tied in series with the anodes of the thyratron tubes 216 and 217. The primary winding 220 of the transformer 219 is connected across the power supply lines 15 and 16. The grids of the thyratrons 216 and 217 are respectively connected with a pair of output terminals 221 and 222 of a grid control circuit 223 diagrammatically represented in block form. A control signal from the current gate control circuit, as previously described in connection with FIG. 1, is received by the grid control circuit block 223 at a pair of input terminals 224 and 225.

The controllable armature and field excitation system also includes a field winding 226 of the motor 210. The field winding 226 is tied to a pair of output terminals 227 and 228. The first output terminal 227 is connected to the cathodes of a pair of thyratron tubes 229 and 230. The second output terminal 228 is tied to a winding 231 of a transformer 232. The winding 231 is tied with the anodes of the thyratrons 229 and 230. A primary winding 233 of the transformer 232 is connected across the power supply lines 15 and 16. The grids of the thyratrons 229 and 230 are respectively connected to a pair of output terminals 234 and 235 of a grid control circuit 236, diagrammatically represented in block form. A control signal from the current gate control circuit, as previously described in connection with FIG. 1, is received by the grid control circuit block at a pair of input terminals 237 and 238. This completes the circuitry of the control for the armature and field excitations system.

As previously mentioned, the feedback source, error detector, current gate control circuit and the cross-over trigger signal circuit set forth in FIG. 2 are the same as illustrated and described in connection with FIG. 1. Also, the operation and function of said components is the same and, as a matter of convenience, will not be repeated.

In the controllable armature and field excitation system illustrated in FIG. 2, excitation is controlled by controlling the conduction period of the thyratron tubes 216, 217, 229 and 230. Those skilled in the art will readily recognize that there are numerous devices that may be utilized to supply power to the armature and field windings and which may be controlled by thyratron tubes. Also, there are numerous ways of converting a control signal into a signal capable of controlling the conduction of thyratron tubes. Accordingly, the thyratron tubes 216 and 217, the transformer 219 and the output terminals 214 and 215 are shown enclosed by a broken-line block form 239 indicative that the thyratrons may be connected in any one of several manners. The grids of the thyratron tubes 216 and 217 are shown connected to the output terminals 221 and 222, respectively, of the block diagram 223 which symbolizes a grid control circuit. The output signal appearing across the terminals 221 and 222 determines the conduction period of the thyratron tubes 216 and 217. The control grid circuit 223 receives an input signal at the terminals 224 and 225 from the current gate control circuit, and depending on the nature of the grid control circuit 223, the input signal causes a shift in phase of the grid current or a variation in the grid voltage of the thyratron tubes 216 and 217.

Control of the excitation of the field winding 226 is accomplished in a manner similar to that designated in connection with the armature control circuit. The thyratron tubes 229 and 230, the transformer 232 and the terminals 227 and 228 are shown enclosed by a broken-line block form 240 which, similar to the block 39, is indicative of the numerous manners in which the thyratron tubes may be connected. Likewise, the grids of the thyratron tubes 229 and 230 are shown connected to the output terminals 234 and 235 of the grid control circuit 236 which operates similar to that of grid control circuit 223. The grid control circuit 236 receives an input signal at the terminals 237 and 238 from the current gate control circuit, and depending on the nature of the grid control circuit 236, the input signal causes a shift in phase of the grid current or a variation in the grid voltage of the thyratron tubes 229 and 230.

FIG. 2 further illustrates that the principles of this invention, when incorporated in a control system may be utilized to directly control the armature and field windings of a shunt direct current motor. FIG. 1 illustrates an embodiment of a motor-generator control circuit wherein the armature voltage of the motor is controlled by controlling the field excitation of a direct current generator which in turn supplies the voltage to the armature of the direct current motor.

Those skilled in the art will readily recognize that there are numerous applications both in electrical power and electronic fields wherein the principles of this invention may be incorporated. Hence, the scope of the present invention is not to be limited to the structures described and illustrated herein, but is best defined by the following claims.

I claim:
1. In a control system for controlling the electrical power applied to at least one device, the combination comprising:
at least one electrical device to be controlled, the device including means for receiving electrical power and the operating condition of the device being responsive to the electrical power received;
a controllable power source providing electrical power to each device to be controlled;
a feedback signal source connected to the device to be controlled and providing an electrical signal proportional to the actual condition of the device to be controlled;
a reference signal source providing an electrical reference signal proportional to the desired condition of the device to be controlled;
an error detector adapted to receive a portion of said feedback and reference signals and adapted to compare said signals and produce an error signal proportional to the difference between said feedback and said reference signals;
a control circuit including a plurality of current gates connected in parallel with each other and in series with said error detector to receive said error signal, each of said current gates further including a control element and being individually responsive to trigger signals of different polarity;
the control element of each current gate connected in common with the control element of said other current gate, a first electrode connected in common with the first electrode of said other current gate, and a second electrode;
a pair of output power control circuits each connected to control said controllable power source, one of said output power control circuits being connected between said second electrode and said first electrode of one of said current gates, and the other of said output power control circuits being connected between said second electrode and said first electrode of the other of said current gates; and
a trigger signal circuit providing trigger signals for said current gates, the trigger circuit including a fixed direct current voltage source connected across said control elements and said first electrodes of said current gates, a variable direct current voltage source connected across said control elements and said first electrodes of said current gates so as to oppose said fixed direct current voltage source, said variable direct current voltage source comprising a four-terminal bridge rectifier with two terminals connected across a portion of said feedback source, and the remaining two terminals connected to opposite terminals of a series circuit comprising an alternating current voltage source and a winding of a transformer, a second four-terminal bridge rectifier with two terminals connected across a second winding of said transformer, and a variable resistance connected across the remaining two terminals of said second bridge rectifier and across said control elements and said first electrodes.

2. A control network for controlling the speed of electric machines having armature and field windings and comprising:
an electrical circuit connected to the machine to be controlled and providing an electrical feedback signal proportional to the actual speed of said machine;
an electrical source providing an electrical signal proportional to the desired speed of said machine;
an error detector connected to receive a portion of said reference and said feedback signals and adapted to compare said signals and to produce an error signal proportional to the difference between said reference and said feedback signals;
a control circuit for individually controlling the electrical excitation of said field and said armature windings of said machine to be controlled, including a PNP and a NPN transistor connected in parallel with the base of each of said transistors connected in common with the base of said other transistor, the emitter of each of said transistors connected in common with the emitter of said other transistor, and the collector of each of said transistors connected in series with said error detector and collector of said other transistor, and a pair of output elements each connected to control one of said excitations with one element connected between the collector and emitter of one of said transistors and the other of said output elements connected between the collector and emitter of the other of said transistors;
and a trigger signal circuit for individually triggering said transistors, the trigger signal circuit including a fixed direct current voltage source, a variable direct current voltage source connected across said fixed direct current voltage source so as to oppose said fixed direct current voltage source, said variable source including a potentiometer connected across said feedback source and providing a signal proportional to the magnitude of said feedback source, a four-terminal bridge rectifier with two terminals connected across said potentiometer and two other terminals connected to opposite ends of a series circuit comprising an alternating current voltage source and a winding of a transformer, a second four-terminal bridge rectifier with two terminals connected across a second winding of said transformer, and a variable resistance connected across the remaining two terminals of said second bridge rectifier and across said fixed source.

3. In a speed control for an electric motor, the combination comprising:
an electric motor having an armature and a field winding;
a controllable electrical power excitation source providing excitation to said armature winding;
a controllable electrical power excitation source providing excitation to said field winding;
an electrical signal generator mechanically connected to the rotor of said motor and providing an electrical feedback signal proportional to the actual speed of said motor;
an electrical source providing an electrical reference signal proportional to the desired speed of said motor;
an error detector connected to receive a portion of said reference and said feedback signals and adapted to compare said signals and to produce an error signal proportional to the difference between said reference and said feedback signals;
a current gate control circuit for individually controlling said armature and field excitation power sources, including a pair of current gates connected in parallel, each of said current gates having a control element connected in common with the control element of said other current gate, and a first electrode connected in common with the first electrode of said other current gate, and a second electrode, a pair of output elements each connected to control one of said excitation sources, one of said output elements being connected between the second electrode of one of said current gates and the common-connected first electrode and the other of said output elements being connected between the second electrode of the other current gate and the common-connected first electrodes, and said second electrode of each of said current gates connected in series with said error signal and said second electrode of said other current gate;

and a triggering circuit for individually triggering said current gates including a fixed direct current voltage source connected across said control elements and said first electrodes of said current gates, and a variable direct current voltage source providing a signal proportional to the speed of the motor and connected across said fixed source whereby the polarity of said fixed source opposes the polarity of said variable source.

4. A speed control in accordance with claim 3 in which the variable direct current voltage source includes a four-terminal bridge rectifier with two terminals connected across a portion of said feedback source, and two other terminals connected to opposite terminals of a series circuit comprising an alternating current voltage source and a winding of a transformer, a second four-terminal bridge rectifier with two terminals connected across a second winding of said transformer, and a resistance connected across the remaining two terminals of said second bridge rectifier and across said fixed source.

5. An electrical isolating circuit for transferring a direct current signal from a source to a receiver and isolating said source from said receiver, said electrical circuit comprising:

- a source providing a direct current input signal;
- a first resistor connected across said input source;
- a transformer having an isolating first and a second winding and a pair of terminals for each of said windings;
- a four-terminal bridge rectifier circuit having two terminals connected across said resistor and a third terminal connected to one terminal of the first winding of said isolating transformer;
- an alternating current voltage source connected between the fourth terminal of said first four-terminal bridge and the second terminal of said first winding of said isolating transformer;
- and a second four-terminal bridge rectifier with two terminals connected to said terminals of said second winding of said isolating transformer, said second rectifier having two other terminals connected across a second resistance.

References Cited by the Examiner

UNITED STATES PATENTS

| | | | |
|---|---|---|---|
| 2,749,493 | 6/1956 | Fischer | 318—146 X |
| 2,888,621 | 5/1959 | McLane | 318—143 X |
| 3,022,453 | 2/1962 | Jones | 318—154 |
| 3,108,214 | 10/1963 | Wilkerson | 318—144 |
| 3,197,688 | 7/1965 | Horner | 318—144 |
| 3,219,900 | 11/1965 | Wilkerson | 318—146 X |

ORIS L. RADER, *Primary Examiner.*

J. C. BERENZWEIG, *Assistant Examiner.*